United States Patent Office 3,482,934
Patented Dec. 9, 1969

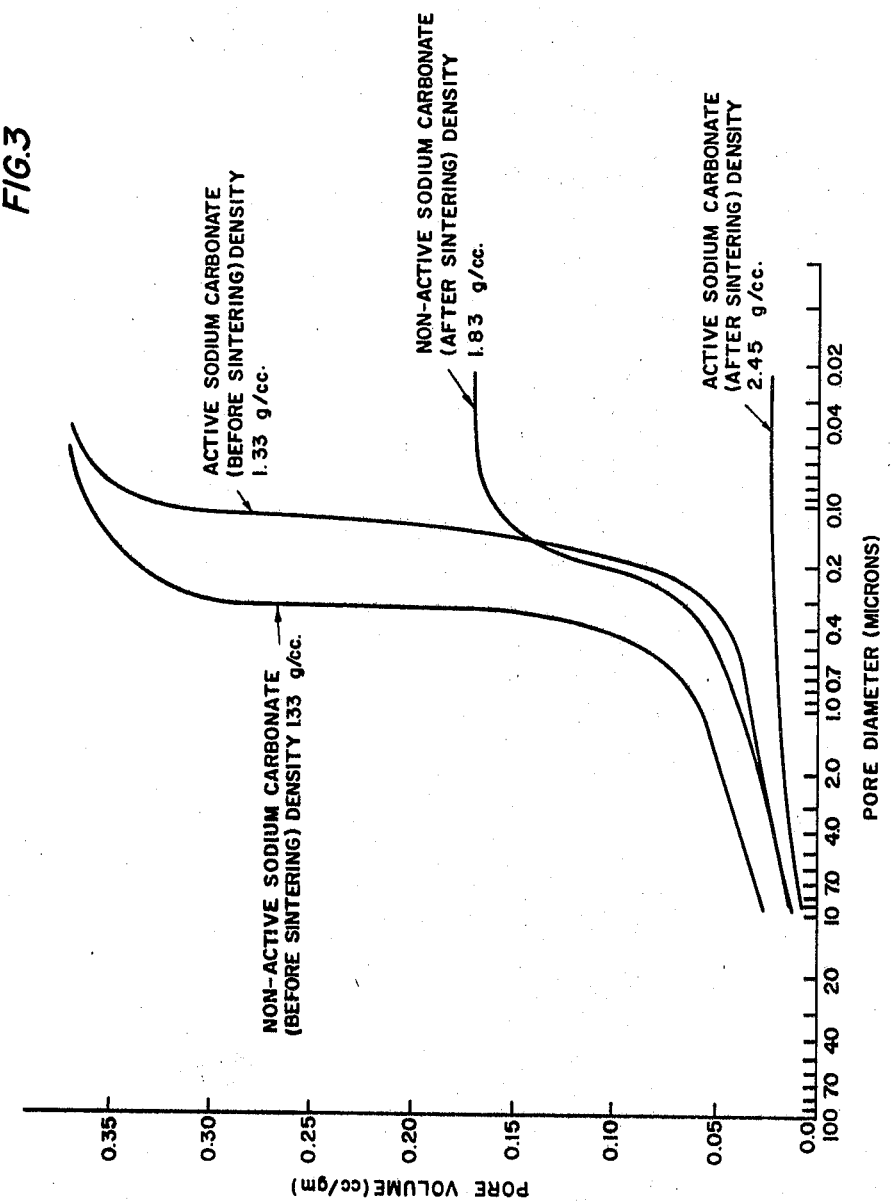

3,482,934
PREPARATION OF DENSE SODIUM CARBONATE AND THE ACTIVE INTERMEDIATE PRODUCT
Patrick M. Di Bello, Matawan, N.J., and Alan B. Gancy, West Acton, Mass., assignors to FMC Corporation, New York, N.Y., a corporation of Delaware
Filed Dec. 21, 1966, Ser. No. 603,477
Int. Cl. C01d 7/12
U.S. Cl. 23—63                                8 Claims

ABSTRACT OF THE DISCLOSURE

Sodium bicarbonate is converted to an "active sodium carbonate" having a smaller size pore content, higher surface area, and smaller crystallite size than conventional soda ash, by heat treating sodium bicarbonate at temperatures up to 260° C. in an atmosphere having an ambient water vapor content below about 200 mm. of Hg; this "active sodium carbonate" is heated at from 300–800° C. to obtain a sodium carbonate (soda ash) product having a bulk density as high as 80 lbs./cu. ft.

BACKGROUND OF THE INVENTION

Field of the invention

This invention relates to a highly dense sodium carbonate (soda ash) and to the method of preparing same from a common precursor crystal, namely sodium bicarbonate, which yields soda ash on being heated.

Description of the prior art

A number of different methods are presently employed in producing commercial soda ash. One of these methods includes the classical Solvay or ammonia-soda process in which an ammoniated, aqueous brine is reacted with carbon dioxide to form sodium bicarbonate crystals and these crystals are precipitated from solution and subsequently calcined to sodium carbonate. This product can be densified up to 60 lbs./cu. ft. if desired by adding water to form sodium carbonate monohydrate, and calcining the monohydrate to form a more dense soda ash.

Other known methods for producing soda ash from natural minerals such as crude trona involve the production of sodium carbonate monohydrate or monoclinic sodium sesquicarbonate crystals as intermediates which are then calcined to soda ash. One such process employing sodium carbonate monohydrate as an intermediary is described in U.S. Pat. 2,962,348 issued to Seglin et al. on Nov. 29, 1960. Other processes utilizing monoclinic sodium sesquicarbonate crystals as intermediaries are described in detail in U.S. Pat. 2,346,140 and the improvements thereon in U.S. Pat. 2,639,217 and U.S. Pat. 2,954,282.

One difficulty with the soda ash produced by the above processes is the relatively low bulk density of the resultant product, i.e., bulk densities of from about 30–60 lbs./cu. ft. Soda ash having higher bulk densities but with the same degree of purity is most desirable because it facilitates shipping and handling, lowers freight costs, and results in improved operations of glass producers who use either a wet-batch or dry-mix technique for making glass.

The denser soda ash with its low porosity is preferred in wet-batching methods because it takes up less water than a more porous, less dense soda ash. Similarly, high density soda ash is preferred for dry-mixing with sand because the denser soda ash has less tendency to segregate from the sand. Greater homogeneity in the mix is obtained by using a higher density soda ash because it more closely approximates the density of the sand and other ingredients of the mix.

In our co-pending application Serial No. 420,601, filed on Dec. 23, 1964 in the names of A. B. Gancy and P. M. Di Bello, now U.S. Pat. 3,333,918, issued on Aug. 1, 1967, there is described a process for producing a highly dense soda ash, i.e., as high as 80 lbs./cu. ft., of high purity and of high whiteness utilizing either sodium sesquicarbonate or sodium carbonate monohydrate as the precursor crystals of the desired soda ash. In this process these precursor crystals are heat treated under specified conditions of temperature and ambient water vapor concentrations until they have been calcined to an "active sodium carbonate" product; this is then sintered for a time sufficient to increase the bulk density of the sintered soda ash to above 60 lbs./cu. ft. However, this process is concerned with utilizing either sodium sesquicarbonate or sodium carbonate monohydrate as the soda ash precursor. It does not describe a process whereby other precursors can be converted to dense soda ash.

It is an object of the present invention to provide a highly pure soda ash directly from sodium bicarbonate which has a density of at least 60 lbs./cu. ft. and as high as 80 lbs./cu. ft. or above by means of a simplified treating process.

It is a further object of the present invention to provide a highly pure soda ash from sodium bicarbonate which is more susceptible to densification on heat sintering than conventional soda ash.

These and other objects of the invention will be obvious from the following description.

SUMMARY OF THE INVENTION

We have now found that a highly dense, pure soda ash can be produced from sodium bicarbonate crystals by heat treating these crystals at a temperature of up to about 260° C. (and preferably at temperatures of from about 120° to 180° C.) in an atmosphere having an ambient water vapor pressure below about 200 mm. of mercury (and preferably below about 75 mm. of mercury) until they have been converted to an "active sodium carbonate" product, and then sintering the resultant "active sodium carbonate" at temperatures of from about 300° C. to about 800° C. in a non-reactive atmosphere for a time sufficient to increase bulk density of the sintered soda ash to above about 60 lbs./cu. ft.

The term "active sodium carbonate" product refers to a specific soda ash which is obtained by conversion of the precursor crystals under the above reaction conditions, and which is useful as a novel soda ash per se in glass making and chemical reactions because of its smaller size pore content, higher surface area and smaller crystallite size than conventional soda ash as set forth hereinafter. It is "active" because it is more susceptible to densification on heat sintering than soda ash produced by a conventional calcination of sodium bicarbonate.

BRIEF DESCRIPTION OF THE DRAWINGS

In the drawings.

FIGURE 3 is a graphic representation of pore size and porosity of samples of soda ash.

DESCRIPTION OF THE INVENTION AND THE PREFERRED EMBODIMENTS

Figure 1:
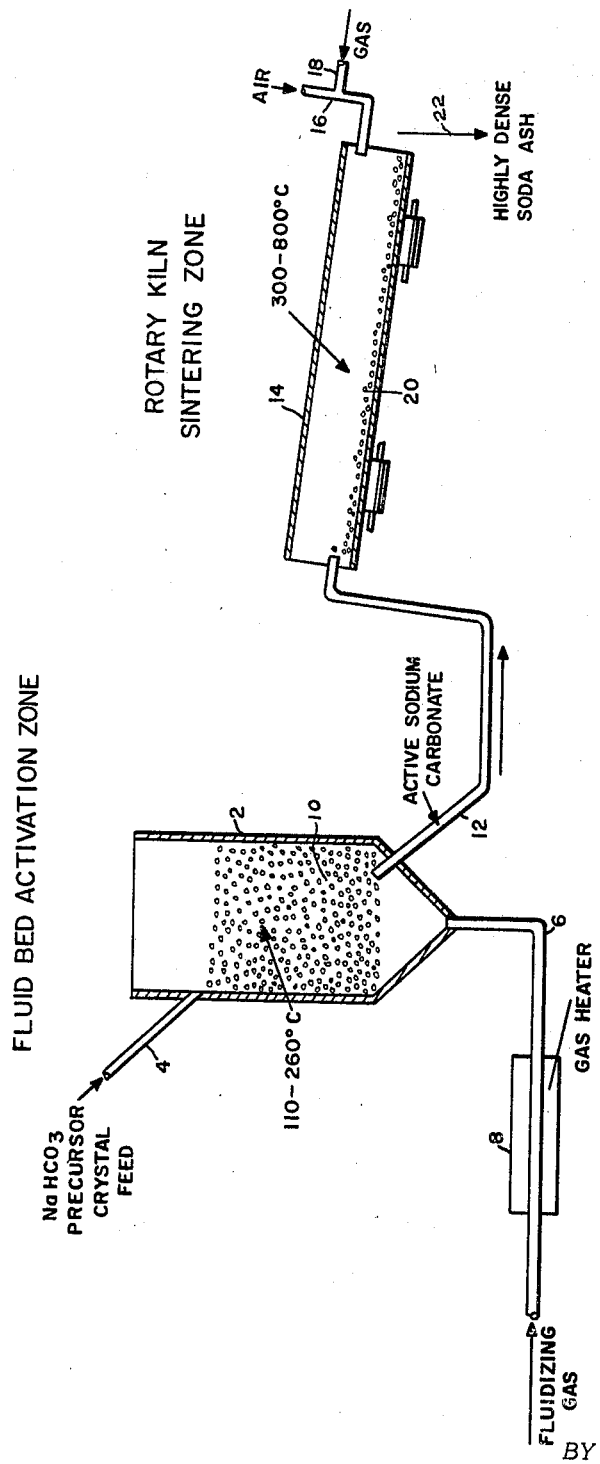
FIGURE 1 is a diagrammatical flow sheet of the equipment for carrying out the instant process.

In carrying out the present invention, precursor crystals of sodium bicarbonate are initially precipitated from a concentrated aqueous solution containing sodium bicarbonate values in any conventional manner. The crystals thus obtained are thermally treated to convert them to sodium carbonate in an "active" form, and then sintered to increase their density.

The thermal treatment consists of heating the precursor sodium bicarbonate crystals at temperatures of up to about 260° C. in an atmosphere having ambient water vapor pressure below about 200 mm. of mercury until conversion of the sodium bicarbonate crystals to soda ash results. To obtain optimum activation, temperatures of from about 120° to about 180° C. at water vapor pressures below about 75 mm. of mercury have been found effective. During this conversion water and carbon dioxide are liberated.

The conversion must be carried out under conditions and in an apparatus which can remove the decomposition gases evolved during the reaction at a rate sufficient to reduce the ambient water vapor pressure around the crystals to the extent required for activation. Since carbon dioxide ($CO_2$) is given off during the conversion, the $CO_2$ partial pressure is reduced along with the $H_2O$ partial pressure. The final limit on water vapor pressure which will permit the activation desired will depend on the temperature employed in producing the "active sodium" and on the desired final density of the sintered product.

The reaction which occurs when the precursor sodium bicarbonate crystals are converted to "active sodium carbonate" may be illustrated by the following equation:

$$2\ NaHCO_3 \rightarrow Na_2CO_3 + H_2O\uparrow + CO_2\uparrow$$

The preferred technique for heating the precursor sodium bicarbonate crystals to obtain "active sodium carbonate" and for removing the evolved water and carbon dioxide, is to utilize a fluid bed. A fluid bed is made up by adding a charge of the precursor crystals to a hollow, substantially vertical, tubular reactor and then passing a stream of gas upward through the reactor at a velocity sufficient to maintain the charge in fluid suspension. The thermal energy required to carry out the conversion of the sodium bicarbonate crystals to "active sodium carbonate" may be supplied by heating the fluidizing gas or by placing heating means within or around the bed. The fluidizing gas also must be of sufficient velocity to sweep away the decomposition gases, i.e. water vapor and $CO_2$, which are evolved during the reaction. In this way the effective ambient water vapor pressure surrounding the precursor sodium bicarbonate crystals is sufficiently reduced to obtain conversion to "active sodium carbonate".

An alternate method is to heat the precursor crystals in a heating chamber maintained at sub-atmospheric pressures by means of a vacuum pump. The vacuum pump thereby removes water evolved during the reaction and maintains the ambient water vapor pressure below the required level.

When carrying out the thermal treating step for conversion of the precursor sodium bicarbonate crystals to "active sodium carbonate," temperatures of about 110° to 260° C. and an atmosphere having an ambient water vapor pressure below about 200 mm. of mercury have been found suitable; this active product yields the desired increase in density, upon subsequently being sintered. Maximum activation is obtained at somewhat lower tempreatures, e.g. up to about 180° C. The density of the finally sintered product drops off at activation temperatures above 180° C. The use of temperatures below about 110° C. is possible but is not desirable because the rate of conversion of the precursor crystals to "active sodium carbonate" is too slow for commercial processing.

In the sintering step the "active sodium carbonate" is treated at a temperature of about 300–800° C. for a period of time sufficient to densify this product to the desired degree. The sintering operation can be conducted for example in a simple furnace, rotary kiln, or a fluid bed reactor havin a non-reactive atmosphere. This atmosphere may be obtained by using gases such as air, nitrogen, or flue gases obtained by burning natural gas in an excess of air. In the present sintering operation the feed to the sintering zone is substantially all soda ash which has been rendered "active" in the preceding thermal reaction zone. Accordingly, the sintering operation is intended merely to densify the soda ash to the desired extent by heating each particle into a more imporous, coherent mass without melting.

In the sintering operation the "active sodium carbonate" has been found to sinter more rapidly than its non-activated counterpart. Further, the "activated sodium carbonate" can be sintered to higher density at lower sintering temperatures than can the non-activated sodium carbonate. In general, sintering temperatures of about 300° C. are sufficient to obtain densification. With increasing sintering temperatures up to 800° C., increased densification is obtained. In general, sintering at 400° C. for about 30 minutes is employed as an arbitrary standard in the laboratory to determine activation, i.e. the susceptibility of a sample to densification. Sintering under these conditions normally is sufficient to obtain high densification of "active sodium carbonate."

One method (mercury displacement method) for determining the particle density of the sintered product or of the "active sodium carbonate" is to weigh a given charge of the sodium carbonate sample into a picnometer of given volume, subject the contents of the picnometer to a vacuum of about 50 microns or less, place the picnometer in a well of mercury and allow the mercury to fill the picnometer to mark at atmospheric pressure. The particle density of the sample can then be calculated since the weight of charge is known and the volume of mercury displaced by the charge (volume of charge) can readily be determined.

When using the above method, conventional sodium carbonate derived from sodium bicarbonate, which has not been activated and which is sintered at 400° C. for 30 minutes, has a particle density of about 1.8 g./cc. (bulk density of about 58 lbs./cu. ft.). "Activated sodium carbonate" derived from sodium bicarbonate, which has been sintered at 400° C. for 30 minutes, has a particle density of about 2.4 g./cc. (bulk density of about 78 lbs./cu. ft.).

The porosity of "active sodium carbonate" or sintered soda ash therefrom is determined by measuring the volume of sample that is penetrable by mercury when the pressure is increased from 1.8 to 5,000 p.s.i. absolute. The porosity of the sample can be determined readily by using an Aminco-Winslow porosimeter, manufactured by the American Instrument Co. Inc., of Silver Springs, Md., which is designed to permit pressures of up to 5,000 p.s.i. absolute to be exerted on mercury used to penetrate the pores. In using this technique the sample is initially subjected to mercury under a pressure of 1.8 p.s.i. absolute. At this pressure, the mercury penetrates all voids and surface cracks which are larger than 100 microns. As the pressure on the mercury is increased, up to 5,000 p.s.i. obsolute, the mercury penetrates increasingly smaller pores in the sample. The cumulative volume of mercury which penetrates the sample at a given pressure is then recorded at pressures at up to 5,000 p.s.i. absolute. The pressure necessary to penetrate pores of a given diameter is known and the volume penetration can be plotted against pore size (diameter). In this way the volume of the pores corresponding to any given pore size can be determined for a sample. The "pore volume" as used in this application refers to the cumulative volume of mercury which penetrates the sample at pressures up to about 5000 p.s.i. absolute.

When conversion of a precursor sodium bicarbonate crystal to "active sodium carbonate" is carried out in a fluidized bed, the fluidizing gas can be any gas which is non-reactive with either sodium bicarbonate or sodium carbonate per se. These include air, nitrogen, and other non-reactive gases which contain minimal amounts of carbon dioxide and/or water vapor. The presence of carbon dioxide in the fluidizing gas should be minimized since it reduces the degree of activation at any given water vapor partial pressure. The velocity of the fluidizing gas used to support the fluid bed must be sufficient to reduce the water vapor atmosphere surrounding the precursor crystals in the bed in order for activation to be obtained. The exact velocity of the fluidizing gas will depend in large measure upon the water vapor content and the fluidizing characteristics of the particles which can be utilized in producing the "active sodium carbonate."

The most expedient way to assure complete activation of the sodium carbonate during the thermal treating process, regardless of whether a fluid bed or vacuum heating chamber is employed, is to maintain as low an ambient water vapor pressure as is commensurate with economic operations. The degree of activation appears to increase as the ambient water vapor pressures of the precursor crystals in the treating chamber decreases up to a given value, below which little increase in "activation" is obtained. Thus, when converting sodium bicarbonate to "active sodium carbonate," it is preferred to utilize water vapor pressures lower than 75 mm. of mercury to obtain maximum "activation" of the sodium carbonate. The precise relationship of temperature, water vapor pressure and degree of activation (as determined by the density of the finally sintered product) is set forth in Examples 2 and 3 and in FIGURES 2 and 3 of the drawings which graphically illustrate the results obtained.

The invention will now be illustrated by reference to the following drawings.

In the drawings FIGURE 1 is a diagrammatical flowsheet which illustrates means for carrying out the present process. These include a fluid bed for obtaining "active sodium carbonate" and a rotary kiln for sintering the "active sodium carbonate" to obtain a highly dense soda ash.

Figure 2:
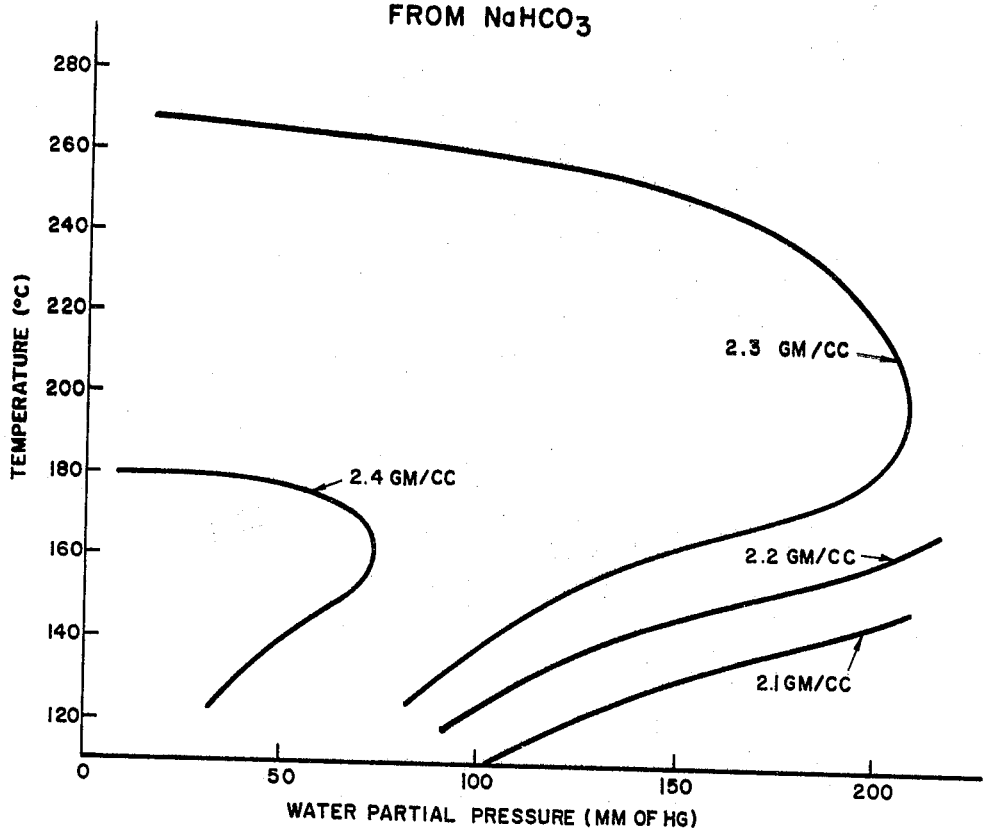
FIGURE 2 is a graph illustrating the relationship between density of the product and the variations in temperature and water vapor pressure used in forming the precursors used in preparing the product.

FIGURE 2 illustrates the change in particle density of the final sintered soda ash which is obtained where different combinations of temperatures and water vapor pressures are used in forming the precursor "active sodium carbonate" from sodium bicarbonate. These results are obtained by the methods set forth in Example 2.

FIGURE 3 is a graphic representation of the relative porosity and the pore size of both activated and non-activated sodium carbonate derived from the precursor sodium bicarbonate. The porosity and pore size of resulting product obtained by sintering each of these sodium carbonates is also illustrated. These results are obtained by the procedure set forth in Example 3.

In the embodiment illustrated in FIGURE 1 sodium bicarbonate crystals are fed through line 4 into a fluid bed activation zone 2. The fluid bed 10 is ssutained by means of a fluidizing gas which is introduced through line 6. The gas is preheated by gas heater 8 in order to supply the thermal requirements of the fluid bed 10. The fluid bed 10 is maintained at a temperature of from about 110° to about 260° C. and at water vapor pressures below about 200 mm. of mercury. "Active sodium carbonate" is removed from the fluid bed 10 through line 12 and is conveyed to rotary kiln sintering zone 14. The "active sodium carbonate" from line 12 is fed into the mouth of the kiln 14 and is heated by hot gases generated within the kiln. These gases are obtained by burning gas, which is introduced through line 18, with air which is introduced through line 16, at the base of the kiln. The "active sodium carbonate" is heated in the kiln in bed 20 at a temperature of from about 300–800° C. until the desired densification has taken place. Thereafter highly dense soda ash 22 is removed from the base of the kiln as the product.

The following examples are given to illustrate the present invention but are not deemed to be limiting thereof.

EXAMPLE 1

One hundred grams of sodium bicarbonate, obtained by crystallizing $NaHCO_3$ crystals from a liquor containing sodium carbonate and sodium bicarbonate values, were charged into a fluid bed reactor. The reactor was made up of a glass tube having an inside diameter of 1¾ inches and was fitted with a coarse fritted glass plate at the base of the tube to distribute inlet gases. Air, which was used as the fluidizing gas, was first passed through a flow meter to regulate the gas flow and subsequently into a gas heater before being passed into the base of the fluid bed reactor. The partial pressure of water in the gas stream was determined from wet bulb and dry bulb temperature readings of the gas stream before entering the fluid bed reactor. The bed temperature was determined with a thermocouple probe suspended within the reactor about 2 cm. from the fritted plate at the base of the reactor. The air used to support the fluidized bed was first preheated to 177° C. in the gas heater and then passed through the bed at a rate corresponding to a mean linear velocity of 0.65 ft./sec. The fluid bed was maintained at a reaction temperature of 117° C. and a water vapor content of 18 mm. of Hg for 45 minutes. Thereafter, "active sodium carbonate" was removed from the bed and found to have a density of 1.32 g./cc., a pore volume of 0.37 cc./g., a median pore size of $0.2\mu$ and a surface area of 9.7 $M^2/g$. The active sodium carbonate was then sintered at 400° C. for 30 minutes. The sintered product had a density of 2.40 g./cc., a pore volume of 0.03 g./cc. and a surface area of 0.4 $M^2/g$. The density of each sample was determined by using a mercury-filled picnometer (mercury displacement method).

EXAMPLE 2

A series of runs were made in which sodium bicarbonate, identical to Example 1, was heated in a fluidized bed at temperatures of from about 105 to 265° C. and at water vapor pressures of nearly 0 up to about 205 mm. of Hg. During these runs the $CO_2$ and $H_2O$ partial pressures were substantially identical. The fluidized bed reactor used in these runs was substantially the same as that described in Example 1. Preheated air was used as the fluidizing medium and was passed through the bed at a temperature sufficient to impart the desired bed temperature. Metered amounts of $CO_2$ and $H_2O$ gases were introduced with the air to give the desired ambient $H_2O$ and $CO_2$ partial pressures in the bed. The ambient water vapor and $CO_2$ partial pressures in the bed are reported in Table 1 along with the fluid bed temperature.

In each of the above runs the sodium bicarbonate samples were heated until conversion to "active sodium carbonate" was completed. After the fluid bed activation treatment, the result sodium carbonate obtained by conversion of the precursor sodium bicarbonate was removed from the bed and sintered at 400° C. for 30 minutes. The particle density of the sintered sodium carbonate products was determined by the mercury displacement method using a mercury-filled picnometer. The particle density of the sintered product corresponding to the temperatures and water vapor pressure used to produce the "active sodium carbonate" is set forth in Table 1.

TABLE 1

| Run No. | Bed temp. (° C) | H₂O partial pressure (mm. of Hg) | CO₂ partial pressure (mm. of Hg) | Sintered density (g./cc.) |
|---|---|---|---|---|
| –93 | 265 | 36 | 36 | 2.30 |
| C–1545–120 | 134 | 5 | 5 | 2.42 |
| –121B | 123 | 2 | 2 | 2.47 |
| –122A | 139 | 3 | 3 | 2.45 |
| –122B | 146 | 3 | 3 | 2.44 |
| –123B | 142 | 3 | 3 | |
| –123A | 155 | 3 | 3 | 2.42 |
| –124A | 129 | 104 | 102 | 2.23 |
| –124B | 137 | 104 | 102 | 2.28 |
| –125A | 146 | 104 | 102 | 2.35 |
| –125B | 158 | 104 | 102 | 2.36 |
| –126 | 133 | 105 | 103 | 2.06 |
| –127A | 128 | 154 | 154 | 2.08 |
| –127B | 134 | 154 | 154 | 2.10 |
| –128A | 141 | 154 | 154 | 2.17 |
| –128B | 149 | 154 | 154 | 2.24 |
| –129 | 160 | 158 | 158 | 2.24 |
| C–1545–130A | 132 | 205 | 205 | 2.01 |
| –130B | 139 | 205 | 205 | 2.08 |
| –131 | 148 | 205 | 205 | 2.12 |
| –132A | 159 | 205 | 205 | 2.20 |
| –132B | 148 | 205 | 205 | 2.15 |
| –133A | 129 | 56 | 56 | 2.39 |
| –133B | 149 | 56 | 56 | 2.41 |
| –134A | 138 | 57 | 57 | 2.38 |
| –134B | 158 | 53 | 53 | 2.42 |
| –135A | 165 | 54 | 54 | 2.42 |
| –135B | 188 | 53 | 53 | 2.41 |
| –137A | 158 | 103 | 103 | 2.38 |
| –137B | 136 | 109 | 109 | 2.26 |
| –138 | 190 | 106 | 106 | 2.34 |
| –141 | 177 | 106 | 106 | 2.38 |
| –142 | 180 | 110 | 111 | 2.30 |
| –143 | 196 | 110 | 111 | 2.30 |
| –27 | 220 | 20 | 20 | 2.36 |
| –28 | 230 | 40 | 40 | 2.35 |

The results obtained in Example 2 are graphically illustrated in FIGURE 2. In FIGURE 2 the abscissa axis defines the water vapor partial pressure of the fluid bed reactor while the ordinate axis indicates the temperature at which the fluid bed activation was conducted. The resulting "active soda ash" samples that have corresponding particle densities, after being sintered, are joined together in a solid curve. In this manner the parameters of temperature and water vapor partial pressures are defined for obtaining given sintered particle densities. To illustrate this, if activation of sodium bicarbonate is conducted at 200° C. and at a water vapor partial pressure from 0 to about 200 mm. of mercury, the resultant sintered soda ash will have densities of at least about 2.3 g./cc. However, if the activation step is conducted at 140° C. the water vapor partial pressure cannot exceed about 100 mm. of mercury in order to obtain particle densities of the finally sintered soda ash at or above 2.3 g./cc. If water vapor partial pressures higher than 100 mm. of mercury are used at 140° C. during the activation stage, the finally sintered product will have corresponding lower densities with increasing water vapor pressures. FIGURE 2 shows that maximum activation is obtained at water vapor pressures below about 75 mm. of mercury and at temperatures below about 180° C.

EXAMPLE 3

Run A.—A charge of sodium bicarbonate, identical to Example 1, was placed in a fluid bed reactor substantially the same as that described in Example 1, and was heated for 37 minutes at a bed temperature of 122° C. to produce an active sodium carbonate. In this run an air stream was passed through the reactor at a mean linear velocity corresponding to 1.11 ft./sec. to fluidize the bed and the fluidized bed had an average humidity of 14 mm. of Hg. The resultant "active sodium carbonate" recovered from the bed had a density of 1.33 g./cc., a pore volume of 0.37 cc./g., a median pore size of 0.2μ and a surface area of 10.4 M²/g. This activated material was then sintered at 400° C. for 30 minutes in a furnace to yield a soda ash having a density of 2.45 g./cc., a pore volume of 0.02 cc./g. and a surface area of 0.4 M²/g.

Run B.—Fifty grams of sodium bicarbonate, identical to that used in Run A was placed in a crucible and heated in a muffle furnace at 225° C. After heating for 60 minutes, the crucible was removed and the product therein identified as soda ash. It had a density of 1.33 g./cc., a pore volume of 0.36 cc./g. and a surface area of 4.0 M²/g. This soda ash was then sintered at 400° C. for 30 minutes and the resultant soda ash analyzed. It had a density of 1.83 g./cc., a pore volume of 0.16 cc./g. and a surface area of 1.4 M²/g.

The results of this example are plotted in FIGURE 3. In this figure the pore volume of the samples, including both the "activated sodium carbonate" of Run A and the non-activated sodium carbonate of Run B, as well as the product obtained by sintering both of these samples, is plotted on the ordinate axis. The diameter of the pores present in these samples, which can be penetrated by mercury, is plotted on the abscissa axis. The curves given in FIGURE 3 clearly show that the pore volume of the "activated sodium carbonate" materially decreases upon being sintered; a striking increase in density results compared with the non-activated sodium carbonate. Further, prior to sintering, the "activated sodium carbonate" has a higher proportion of small diameter pores than does the corresponding non-active sodium carbonate. Upon sintering the "activated sodium carbonate" these small pores disappear and a substantial increase in the density of the sintered product results. More specifically, the elimination of these fine pores by sintering results in reducing the pore volume of the "active" soda ash sample from 0.37 cc./g. to about 0.02 cc./g. (after sintering)—about a 95% decrease in the pore volume of the sample. This degree of pore reduction and concomitant densification cannot be achieved by such sintering unless the sodium carbonate has been initially "activated" in the manner heretofore described.

EXAMPLE 4

A glass tube reactor ¾″ in diameter and 4″ long was sealed at one end and fitted at the other end with a ³⁄₁₆″ ID straight glass tubing 8″ long. A thermocouple tip was attached to the reactor wall to measure temperatures in the reactor. Three grams of sodium bicarbonate were then added to the reactor and the glass reactor placed in a 1″ tube furnace. The open end of the straight glass tubing was then attached to a vacuum pump and the tube furnace heated to a maximum of 225° C. The tube was kept at this temperature for 20 minutes at a vapor pressure of below 200 mm. of Hg. The contents of the reactor were then removed and found to be sodium carbonate; it had a particle density of 1.27 g./cc. when measured by mercury displacement using a mercury-filled picnometer. The sample was then sintered at 400° C. for 30 minutes in an electric oven. The resulting sintered sodium carbonate had a particle density of 2.30 g./cc.

EXAMPLE 5

A series of runs were made in the manner set forth in Example 2 except that various commercially available samples of sodium bicarbonate were used instead of that used in Example 2. In each run the sodium bicarbonate samples were heated in a fluid bed reactor until conversion to "active sodium carbonate" was completed and then sintered at 400° C. for 30 minutes in an electric oven. The particle density (determined by particle displacement method) of the sintered product corresponding to the temperatures and water vapor pressure used to produce the "active sodium carbonate" is set forth in Table 2. As will be seen from Table 2 densification under these conditions resulted in substantial densification in all cases.

TABLE 2

| Run No. | Bed temp. (°C.) | $H_2O$ partial pressure (mm. of Hg) | $CO_2$ partial pressure (mm. of Hg) | Sintered density (g./cc.) |
|---|---|---|---|---|
| -85 | 183 | 8 | 8 | 2.27 |
| -86 | 210 | 17 | 17 | 2.26 |
| -87 | 187 | 20 | 20 | 2.24 |
| -88 | 260 | 20 | 20 | 2.19 |
| -89 | 177 | 19 | 19 | 2.19 |
| -90 | 194 | 20 | 20 | 2.17 |
| -91 | 230 | 20 | 20 | 2.12 |
| C-1635-15 | 124 | 109 | 107 | 2.30 |
| -16A | 121 | 106 | 104 | 2.20 |
| -16B | 120 | 107 | 106 | 2.16 |
| -17A | 125 | 106 | 105 | 2.24 |
| -17B | 133 | 117 | 106 | 2.25 |
| -18A | 123 | 116 | 105 | 2.16 |
| -18B | 130 | 116 | 105 | 2.23 |
| -19 | 117 | 106 | 105 | 2.16 |
| -20A | 143 | 106 | 105 | 2.25 |
| -20B | 143 | 106 | 105 | 2.29 |
| -21A | 124 | 107 | 106 | 2.20 |
| -21B | 164 | 112 | 111 | 2.24 |
| C-1635-22A | 160 | 111 | 110 | 2.34 |
| -26 | 156 | 111 | 110 | 2.25 |
| -39A | 105 | 3 | 3 | 2.41 |
| -39B | 108 | 3 | 3 | 2.32 |
| -41 | 110 | 4 | 4 | 2.37 |
| -49 | 125 | 5 | 5 | 2.44 |
| -50 | 132 | 5 | 5 | 2.44 |
| -51A | 148 | 5 | 5 | 2.44 |
| -51B | 162 | 6 | 6 | 2.43 |
| -52A | 180 | 18 | 18 | 2.36 |
| -52C | 180 | 18 | 18 | 2.31 |
| -53A | 190 | 15 | 15 | 2.31 |
| -53B | 225 | 15 | 15 | 2.26 |

EXAMPLE 6

A 25 gram sample of sodium bicarbonate, identical to that used in Example 1, was placed in a reactor having a heated surface. The sample was heated to 250° C. in the reactor and was maintained at this temperature for two hours. During this time the ambient water vapor pressure of the sample in the reactor was maintained below 200 mm. of mercury. Thereafter the sample was sintered at 500° C. for two hours in an oven. The resulting sintered sodium carbonate had a particle density of 2.17 g./cc. which corresponded to a bulk density of about 65.9 lbs./cu. ft. A second 25 gram sample of sodium bicarbonate was treated in the same manner except that it was sintered for three hours at 500° C. The resulting sintered sodium carbonate had a particle density of 2.27 g./cc. which corresponded to a bulk density of 84.3 lbs./cu. ft.

What is claimed is:

1. As a new composition of matter an active sodium carbonate which is produced by heating precursor sodium bicarbonate crystals to a temperature of from about 110° to about 260° C. in an atmosphere having ambient water vapor pressures from about 0 to about 200 mm. of mercury until said precursor sodium bicarbonate crystals have been converted to an active sodium carbonate, and recovering an active sodium carbonate having a pore volume of about 0.37 cc./g. and which can be sintered to yield a particle density of at least about 2.1 g./cc. when heated at 400° C. for 30 minutes.

2. A process for producing an active sodium carbonate which is more susceptible to densification on heat sintering than conventionally produced soda ash which comprises heating precursor sodium bicarbonate crystals at a temperature of up to about 260° C. in an atmosphere having an ambient water vapor pressure from about 0 to about 200 mm. of mercury until said precursor crystals have been converted to sodium carbonate, and recovering an active sodium carbonate which can be sintered to yield a particle density of at least about 2.1 g./cc. when heated at 400° C. for 30 minutes.

3. Process of claim 2 wherein said heating is carried out at a temperature of from about 110° to 180° C. in an atmosphere having an ambient water vapor pressure and said water vapor pressure is below about 75 mm. of mercury.

4. In a process for producing a dense, highly pure sodium carbonate wherein precursor crystals of sodium bicarbonate are thermally converted to sodium carbonate, the improvement which comprises heat treating said precursor sodium bicarbonate crystals at temperatures of up to about 260° C. in an atmosphere having ambient water vapor pressures from about 0 to about 200 mm. of mercury until said precursor sodium bicarbonate crystals have been converted to an active sodium carbonate having predominantly smaller pores than conventional sodium carbonate, and further treating said active sodium carbonate in a second treating step by heating said active sodium carbonate at temperatures of from about 300° C. to about 800° C. in a non-reactive atmosphere for a time sufficient to densify said active sodium carbonate into a more imporous coherent form without melting, until a final product having a bulk density of above about 60 lbs./cu. ft. is obtained.

5. Process of claim 4 in which the heat treating is conducted at temperatures of from about 110° to about 180° C.

6. Process of claim 4 in which the heat treating is conducted at water vapor pressures of below about 75 mm. of mercury.

7. Process of claim 4 wherein said heat treating step is carried out in a fluidized bed by suspending the precursor sodium bicarbonate crystals in a stream of fluidizing gas, and heating said crystals to a temperature of up to about 260° C. in an atmosphere having ambient water vapor pressure from about 0 to about 200 mm. of mercury.

8. Process of claim 7 in which the heat treating is conducted at temperatures of from about 110 to about 180° C. and in which the ambient water vapor pressure is below about 75 mm. of mercury.

References Cited

UNITED STATES PATENTS

| 3,333,918 | 8/1967 | Gancy et al. | 23—63 |
| 3,336,105 | 8/1967 | Beck et al. | 23—63 |

OSCAR R. VERTIZ, Primary Examiner

G. T. OZAKI, Assistant Examiner